United States Patent [19]

Cousino

[11] 4,116,095
[45] Sep. 26, 1978

[54] METAL SAWING OR MILLING MACHINE

[76] Inventor: Walter F. Cousino, 4830 W. Bancroft St., Toledo, Ohio 43615

[21] Appl. No.: 852,612

[22] Filed: Nov. 18, 1977

Related U.S. Application Data

[63] Continuation-in-part of Ser. No. 822,007, Aug. 5, 1977.

[51] Int. Cl.² .............................................. B23B 5/14
[52] U.S. Cl. .......................................... 82/71; 82/98; 82/101; 51/73 R; 83/471.2; 83/488
[58] Field of Search .................. 82/70.2, 71, 59, 75, 82/81, 101, 102, 98, 20; 51/73 R; 83/471.2, 488

[56] References Cited

U.S. PATENT DOCUMENTS

| 167,645 | 9/1875 | Cohen et al. | 82/64 |
|---|---|---|---|
| 480,461 | 8/1892 | Gilmore | 82/70.2 |
| 3,024,687 | 3/1962 | Brownstein | 82/70.2 |
| 3,025,738 | 3/1962 | Winkler et al. | 82/70.2 |

*Primary Examiner*—Leonidas Vlachos
*Attorney, Agent, or Firm*—W. A. Schaich

[57] ABSTRACT

An apparatus for cutting a plurality of selected lengths from a rod-like workpiece. A plurality of annular saws or mills have cutting teeth formed on the inner annuli which have diameters greater than the diameter of the workpiece. The workpiece is passed through the annuli such that the distance between one saw and the end of the workpiece defines one selected length while the distances between each pair of adjacent saws define the other selected lengths. The saws and the workpiece are relatively rotated in opposite directions, while concurrently the saws are moved transversely to bring the teeth of the saws into cutting engagement with the workpiece. If the apparatus comprises two annular saws, the annular saws are moved in opposite transverse directions so that the saws are concurrently engaging opposite sides of the workpiece. The transverse movements of the saws are controlled such that the saw nearest the end of the workpiece completes its cut first.

5 Claims, 5 Drawing Figures

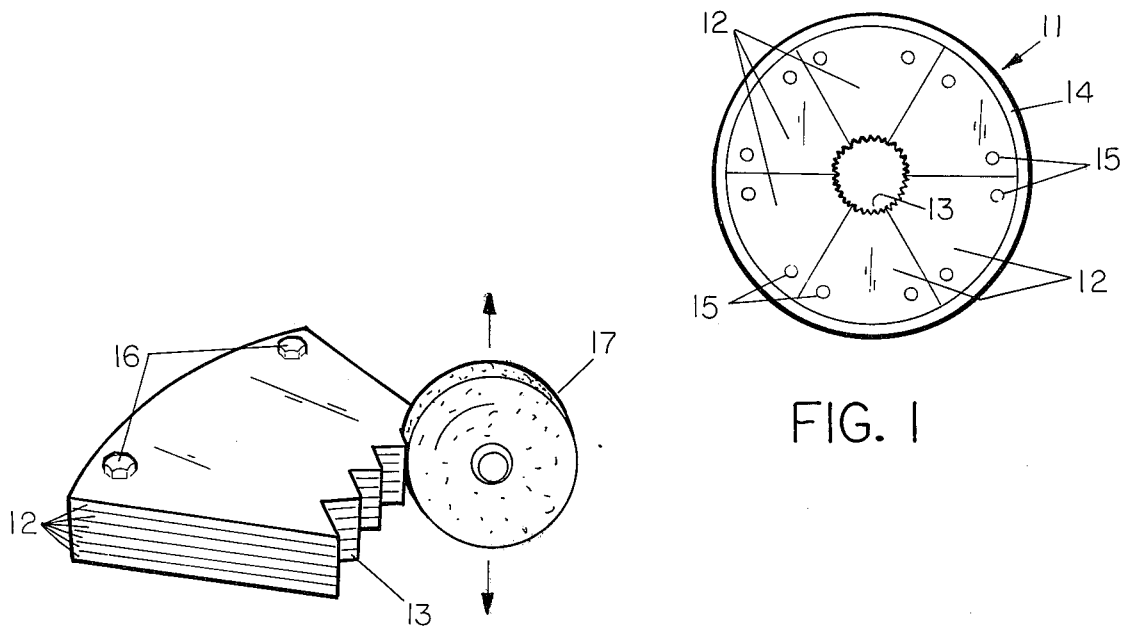
FIG. 1
FIG. 2
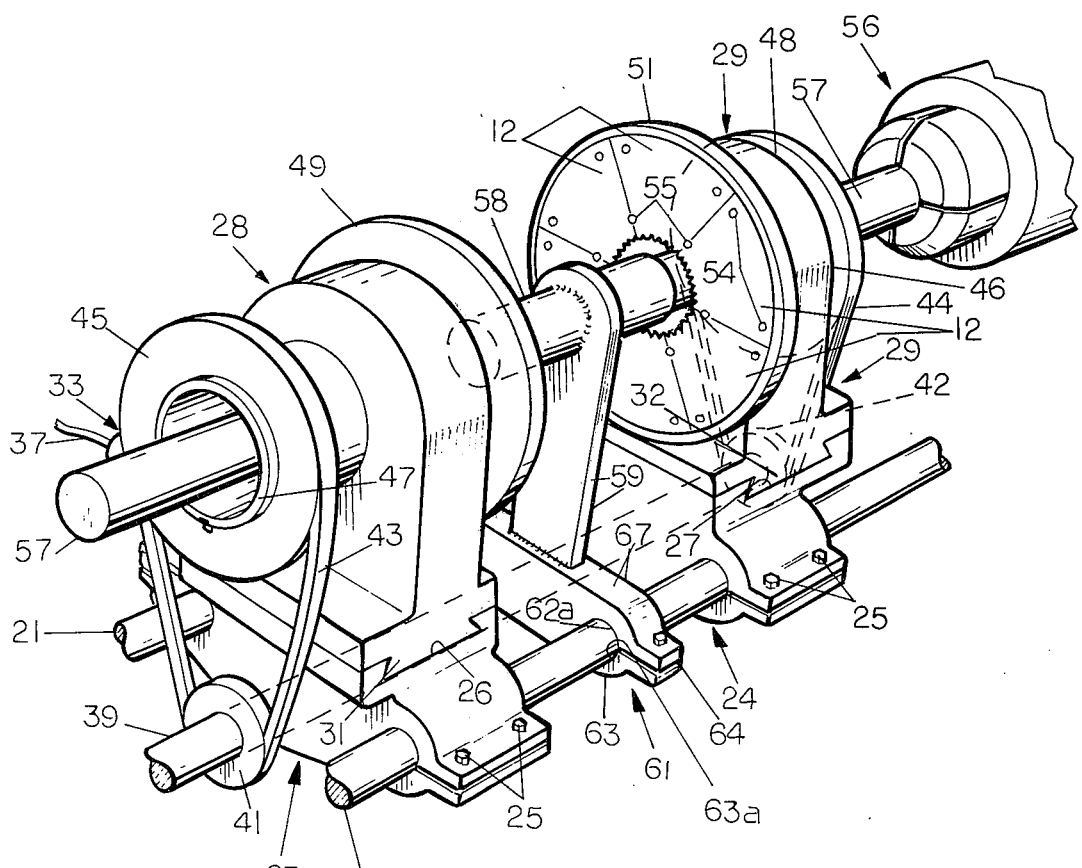
FIG. 3

METAL SAWING OR MILLING MACHINE

CROSS REFERENCE TO RELATED APPLICATION

This application is a continuation-in-part of U.S. patent application Ser. No. 822,007, filed on Aug. 5, 1977 in the name of the inventor hereof and entitled "Metal Sawing Machine and Saw."

BACKGROUND OF THE INVENTION

1. Field of the Invention

This invention relates in general to a machine for cutting bar stock or similar rod-like workpieces and in particular to a bar stock or rod cutting or milling machine which utilizes annular saws or mills having cutting teeth formed on the inner annuli.

2. Description Of The Prior Art

A bar stock or rod cutting machine is one of the oldest and most useful forms of machinery employed in a metal fabricating shop. Literally thousands of articles are produced by taking a length of bar stock and cutting successive pieces from the bar stock upon which subsequent machining operations are performed to produce desired articles.

The commonly utilized bar stock cutting machines employ either a reciprocating linear saw blade or a rotary blade having cutting teeth formed on the periphery thereof. In either case the cutting element or saw is relatively expensive to fabricate because of the necessity of individually grinding or filing of each of the teeth on the saw, whether it be a linear saw or a rotary saw.

It has previously been proposed as, for example, in U.S. Pat. No. 3,039,235 to Heinrich that successive segments may be cut from a very hard workpiece such as a crystal by employing an annular grinding wheel wherein the wheel comprises a relatively thin annular disc having abrasive particles secured to the internal edge of the annulus. Hence the cutting action is really a grinding action and would be prohibitively slow to employ in the cutting of metal bar stock.

The heretofore unsolved problem in using an annular metal cutting saw with the teeth disposed on the internal edge of the annular saw is the difficulty of sharpening of such teeth. Not only does each tooth have to be individually ground but the size of the grinding wheel must necessarily be very small in order to be insertable within the annulus of the saw. Hence, although many people may have heretofore considered employment of an annular saw for metal cutting operations, none have been employed because of the practical difficulties mentioned above.

OBJECTS OF THE INVENTION

Accordingly, an object of this invention is to provide an apparatus for cutting a plurality of successive pieces from bar-stock and similar rod-like workpieces.

A further object is to provide an apparatus for concurrently performing a plurality of milling operations on an elongated workpiece.

A further object of this invention is to provide a bar-stock cutting apparatus which utilizes at least two annular saws each having the cutting teeth formed on the interior annulus of the saw.

Another object of this invention is to provide a bar-stock cutting apparatus which utilizes at least two annular saws which are moved in opposite transverse directions with respect to the workpiece so that the saws are concurrently engaging opposite sides of the workpiece.

Still another object of this invention is to provide a bar-stock cutting apparatus which utilizes at least two annular saws and the saw closest to the end of the workpiece always completes its cut first.

A particular object of this invention is to provide an improved metal rod cutting machine employing a plurality of simultaneously acting rotating cutters wherein each cutter is formed from a plurality of annular segments which are rigidly secured to a supporting ring in peripherially side by side relationship and have cutting teeth formed on the internal edge of the annulus thus defined.

Other objects and advantages of this invention will become apparent to those skilled in the art from the following detailed description, taken in conjunction with the annexed sheets of drawings.

BRIEF DESCRIPTION OF THE DRAWINGS

FIG. 1 is an elevational view of a internally toothed, annular metal cutting tool, such as a saw.

FIG. 2 is a perspective view illustrating the manner in which the segments of the annular saw of FIG. 1 are stacked for concurrent grinding.

FIG. 3 is a perspective view of a cutting apparatus according to the present invention which utilizes a pair of annular cutters to perform concurrent cutting operations.

DESCRIPTION OF THE PREFERRED EMBODIMENT

Figure 4:
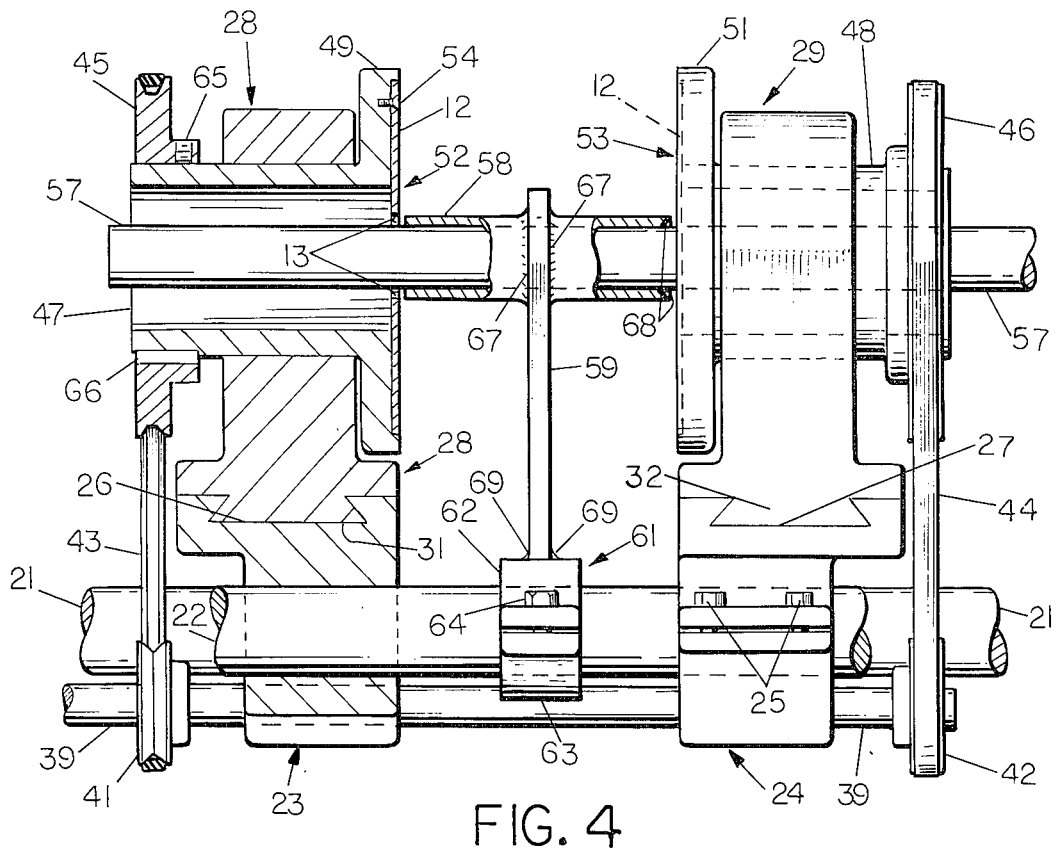
FIG. 4 is a fragmentary elevational view of the cutting apparatus with parts shown in vertical section.
Figure 5:
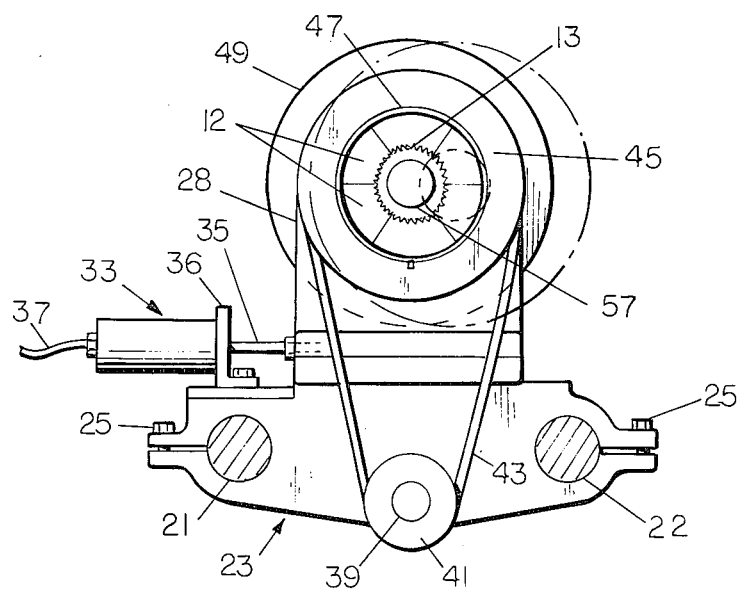
FIG. 5 is an end view of the cutting apparatus shown in FIG. 4.

As discussed in my aforementioned copending application, there is shown in FIG. 1 an annular saw 11 utilized in a machine according to the present invention which comprises a plurality of identical annular segments 12 having a plurality of cutting teeth 13 formed on the inner annulus. The segments are respectively secured in peripherally abutting relationship to a support ring 14 by a plurality of bolts 15 which pass through appropriate holes in the segments and into the support ring 14. Each of the identical segments 12 is formed from relatively thin sheet metal stock of a metal composition that is suitable for heat treatment to provide hardened cutting edges. The segments 12 are preferably formed by a stamping operation and, as illustrated in FIG. 2, may be conveniently sharpened in a concurrent operation by stacking segments 12 on top of each other, securing the segments 12 rigidly together by employment of holding bolts 16 and then concurrently grinding the teeth 13 of all the segments 12 by a grinding wheel 17.

The segments 12 are heat treated either before or after the grinding operation to produce the desired degree of hardness in the teeth 13 so as to permit them to perform a metal cutting operation.

While a relatively thin saw is thus provided, the same segmented construction could be utilized to produce an annular milling cutter.

There is shown in FIG. 3 an apparatus according to the present invention which utilizes a pair of annular saws such that two successive pieces may be concurrently cut from the end of a workpiece. Although any number of annular saws could be used, this description will be limited to the discussion of a cutting apparatus which employs two annular saws. A pair of longitudinally extending support rods 21 and 22 are suitably attached to a support member (not shown). A pair of base members 23 and 24 each have a pair of holes formed therein through which pass the support rods 21 and 22. The base members 23 and 24 are selectively positioned on the support rods in spaced relationship and securely fastened thereto by a plurality of locking bolts 25.

Base members 23 and 24 respectively have dovetailed slots 26 and 27 formed in the tops of the respective members and disposed perpendicularly to the support rods 21 and 22. A pair of cross slide members 28 and 29 respectively have downwardly extending keys 31 and 32 along the bottoms of the respective slide members. The keys 31 and 32 slidably cooperate with the slots 26 and 27 which are provided in the base members 23 and 24.

A pair of fluid actuated motors 33 (only one of which is shown in the drawings) are provided to respectively propel the cross slide members 28 and 29 along the respective base members. The motors can be, for example, either pneumatically or hydraulically actuated motors. The motors 33 have piston rods 35 which are suitably affixed to the cross slide members 28 and 29 respectively. The motors 33 are supported by brackets 36 which are bolted to the respective base members 23 and 24. A source of pressured fluid is coupled to the motors 33 by flexible lines 37.

Cross slide members 28 and 29 respectively define appropriate bearings for journaling the sleeves 47 and 48 for rotation therein about axes perpendicular to the path of sliding motion of the cross slide members 28 and 29. Sleeve members 47 and 48 respectively have radially enlarged flanges 49 and 51 formed on one end thereof and the sleeves are preferably respectively disposed in the cross slide members 28 and 29 so that the flange portions 49 and 51 are located between the cross slide members and in spaced, opposed relationship. The other ends of sleeves 47 and 48 provide a mounting for driving pulleys 45 and 46 respectively.

A drive shaft 39 is mounted for rotation about a parallel axis intermediate support rods 21 and 22 by conventional bearings (not shown) provided in the lower portions of the base members 23 and 24 respectively. A pair of drive pulleys 41 and 42 are suitably affixed to the drive shaft 39 in alignment respectively with the pulleys 45 and 46 which are secured to the outer axial ends of the sleeves 47 and 48. Belts 43 and 44 effect a driving connection respectively between pulleys 41 and 45 and pulleys 42 and 46. Normal slack in belts 43 and 44 permits the required transverse movements of slide members 28 and 29. The drive shaft 39 is driven in any conventional fashion, such as by an electric motor (not shown).

A pair of annular saws or milling cutters 52 and 53 are constructed by attaching the annular saw segments 12 to the enlarged flange portions 49 and 51 with a plurality of flathead screws 54 which pass through holes provided in the outer periphery of the segments 12 and into the respective flange portions. A second set of flathead screws 55 pass through holes provided at each radial intersection of the segments and into the innermost areas of the respective flange portions. The screws 55 must be located far enough from the inner annuli of the saws 52 and 53 so as not to interfere with the cutting operation on the rotating workpiece. The screws 55 provide additional rigidity to the saw, preventing any undesirable vibration of the inner toothed ends of the individual segments.

A hollow collet-type chuck 56 is attached to and rotated by a suitable drive means (not shown). The chuck 56 is used to secure and rotate a workpiece 57 which may comprise either a solid or tubular piece of metal having either a circular or rectangular-shaped cross section. The axis of rotation of the workpiece is parallel to the rotational axes of sleeves 47 and 48. A conventional feeding mechanism (not shown) may be utilized to axially shift the chuck 56 and thus to advance the workpiece a selected amount. The workpiece 57 is fed through a stationary guide and support tube 58 disposed between the cross slides 28 and 29 which can function to steady the workpiece during the cutting operation. The guide tube also functions to support the severed length of workpiece which is located between the two saws after a cutting operation. The guide tube 58 is provided with an inner chamfered edge 68 which functions to pilot the workpiece 57 into the tube 58. Typically, the inside diameter of the tube 58 will be only slightly larger than the diameter of the rotating workpiece.

The guide tube is supported by a tube support plate 59 which is rigidly supported by a split clamp base member 61. The guide tube 58 is attached to the tube support plate 59 by a pair of welds 67. The tube support plate 59 is affixed to the base member 61 by welds 69. The base member 61 comprises a top portion 62 and a bottom portion 63 each having a pair of semi-cylindrical grooves 62a and 63a respectively formed therein such that the two portions may be rigidly secured to the guide rods 21 and 22 at any selected axial position by a pair of locking bolts 64. Thus, if it is desired to cut a workpiece of a different diameter or to cut different lengths off the workpiece, this construction will permit the guide tube assembly to be easily removed and interchanged with a similar assembly which comprises a guide tube having a different diameter and/or length. Guide tube 58 also permits very small lengths to be cut from the end of workpiece 57.

As best shown in FIG. 4, the pulley 45 is secured to the sleeve member 47 by means of a set screw 65. A key 66 is also provided to prevent any rotational slippage. The pulley 46 is attached to the sleeve member 48 and the pulleys 41 and 42 are attached to the drive shaft 39 in a similar manner.

In operation, the workpiece 57 is fed through the two annular saws 52 and 53 and the guide tube 58 so that the end of the workpiece extends past the outermost annular saw 52 by a distance corresponding to the selected length of one of the pieces to be cut. The length of the other piece to be cut is determined by the distance between the saws 52 and 53 and can be changed by moving either base member 23 or 24 along the guide rods 21 and 22 and by moving the respective drive pulley along the drive shaft. Hence, the distance between the saw 52 and the end of the workpiece 57 defines one selected length to be cut while the distance between the saws 52 and 53 defines the other selected length.

Preferably, the saws 52 and 53 are rotated in a direction opposite to the rotation of the workpiece chuck 56, thereby producing a relative speed between the cutting teeth 13 of the internally toothed saws and the workpiece 57 equal to the sum of the rotational speeds of the saws 52 and 53 and the chuck 56. While such rotation is occurring, the cross slide members 28 and 29 are slowly moved transversely but in opposite directions such that the cutting teeth 13 of the saws 52 and 53 respectively come into concurrent engagement with opposite sides of the workpiece 57. The concurrent engagement of the cutting teeth 13 of the two saws with opposite sides of the workpiece 57 is particularly advantageous in reducing any undesirable deflection and/or vibration of the workpiece. This feature is particularly desirable when the workpiece comprises a relatively small rod or thin walled tubing. As a result, the severed lengths of the workpiece may be cleanly cut in every case without leaving any burrs on the cut edges.

The movements of the cross slide members 28 and 29 are controlled by the motors 33 such that the axially outer saw 52 completes its cut of the workpiece well prior to the completion of the cut by the saw 53. Sufficient metal must be left in the cut of inner saw 53 to prevent tearing under the forces generated by saw 52, either a conventional hydraulic or pneumatic circuit can be used to generate the appropriate fluid-actuation signals to the respective motors 33. It should be noted that the internal diameter of the sleeves 47 and 48 have to be at least one and one-half times the diameter of the workpiece 57 in order to prevent interference therewith as the teeth of the saws 52 and 53 are advanced into the workpiece by the transverse movements of the cross slide members 28 and 29.

If the workpiece is a solid piece of metal, it is necessary for the teeth of the saws 52 and 53 to pass completely through the center line of the workpiece and, if the workpiece is tubular, the cutting teeth need only to pass through the outside wall of the workpiece. After the saws 52 and 53 have completed their respective cuts, the cross slide members 28 and 29 are retracted by the motors 33 to allow the feeder mechanism (not shown) to advance the workpiece 57 such that another cutting operation may be performed. The advancement of the workpiece through the guide tube 58 and the sleeve 47 will cause the two severed lengths of the workpiece to fall freely from the sleeve 47 onto a conveyor (not shown) or into a suitable collection bin.

It may be desirable in some instances to use the annular cutters only to cut one or more grooves in the workpiece. In such case the teeth 13 are formed as milling cutters. Thus, there are still a plurality of machine operations which are being performed simultaneously.

Other modifications of this invention will be readily apparent to those skilled in the art, and it is desired that the invention be limited only in accordance with the scope of the appended claims.

What is claimed is:

1. Apparatus for concurrently making two axially spaced cuts on an elongated bar stock type workpiece, comprising, in combination:
   a. chuck means for grasping a portion of said workpiece;
   b. an elongated support underlying the portion of said workpiece projecting outwardly from said chuck means;
   c. a pair of annular cutters having cutting teeth formed on their inner annuli;
   d. a sleeve secured to each said annular cutter;
   e. a pair of sleeve supports adjustable mounted on said elongated support and respectively journalling said sleeves for rotation about the workpiece length axis with both sleeves and cutters surrounding the projecting end of said workpiece;
   f. means for concurrently rotating said sleeves; and
   g. means for concurrently moving said sleeve supports transversely relative to said workpiece to produce two cuts therein spaced according to the longitudinal spacing of said sleeve supports.

2. The combination defined in claim 1 wherein said sleeve supports are respectively moved in opposite transverse directions so that the annular cutters are concurrently engaging opposite sides of said workpiece.

3. The combination defined in claim 1 wherein a workpiece support is disposed between said sleeve supports to support the one severed length of the workpiece on completion of said cutting operation.

4. Apparatus for concurrently making two axially spaced cuts on an enlongated bar stock type workpiece, comprising, in combination:
   a. rotatable chuck means for grasping a portion of said workpiece and rotating same about its length axis.
   b. an elongated support underlying the portion of said workpiece projecting outwardly from said chuck means;
   c. a pair of annular cutters having cutting teeth formed on their inner annuli;
   d. a sleeve secured to each said annular cutter;
   e. a pair of sleeve supports adjustably mounted on said elongated support and respectively journalling said sleeves for rotation about an axis parallel to the workpiece length axis with both said sleeves and said cutters surrounding the projecting end of said workpiece;
   f. means for concurrently rotating said sleeves; and
   g. means for concurrently moving said sleeve supports transversely relative to said rotating workpiece to produce two cuts therein spaced according to the longitudinal spacing of said sleeve supports.

5. The combination defined in claim 4 wherein said sleeve supports are respectively moved in opposite transverse directions so that the annular cutters are concurrently engaging opposite sides of said workpiece.

* * * * *